United States Patent [19]
Imai et al.

[11] 3,741,090
[45] June 26, 1973

[54] FLASHBULB TRIGGERING DEVICE FOR EE CAMERAS

[75] Inventors: Tadayuki Imai, Shinagawa-ku, Tokyo; Hirokazu Kaneko, Ota-ku, Tokyo, both of Japan

[73] Assignee: Kabushiki Kaisha Ricoh, Tokyo, Japan

[22] Filed: Oct. 6, 1971

[21] Appl. No.: 186,912

[30] Foreign Application Priority Data
Oct. 12, 1970 Japan.............................. 45/101183

[52] U.S. Cl. ............... 95/11.5 R, 95/11 L, 95/10 C
[51] Int. Cl. .......................................... G03b 15/04
[58] Field of Search ...................... 95/11.5 R, 11 R, 95/11 L, 10 C; 240/1.3; 431/92, 93

[56] References Cited
UNITED STATES PATENTS
3,589,256  6/1971  Beach ............................. 95/11.5 R
3,602,120  8/1971  Galbraith ........................ 95/11.5 R
3,616,735  11/1971 Bresson .......................... 95/11.5 R

*Primary Examiner*—Robert P. Greiner
*Attorney*—Milton J. Wayne

[57] ABSTRACT

An exposure-meter-pointer pressure plate is displaced a small distance when the brightness of scene is sufficient to use an EE mechanism while the pressure plate is displaced a long distance when the brightness is not enough to use the EE mechanism. Control means at the leading end of a control lever which is displaced together with the pressure plate is adapted to control indirectly a member which triggers or releases a trigger pin of a flashbulb. The pressure plate and the control lever are displaced in response to the downward movement of a shutter release plate in such a manner that when the displacement of the control lever is small the trigger member will not be actuated while when the displacement is large, it is actuated.

3 Claims, 1 Drawing Figure

PATENTED JUN 26 1973 3,741,090
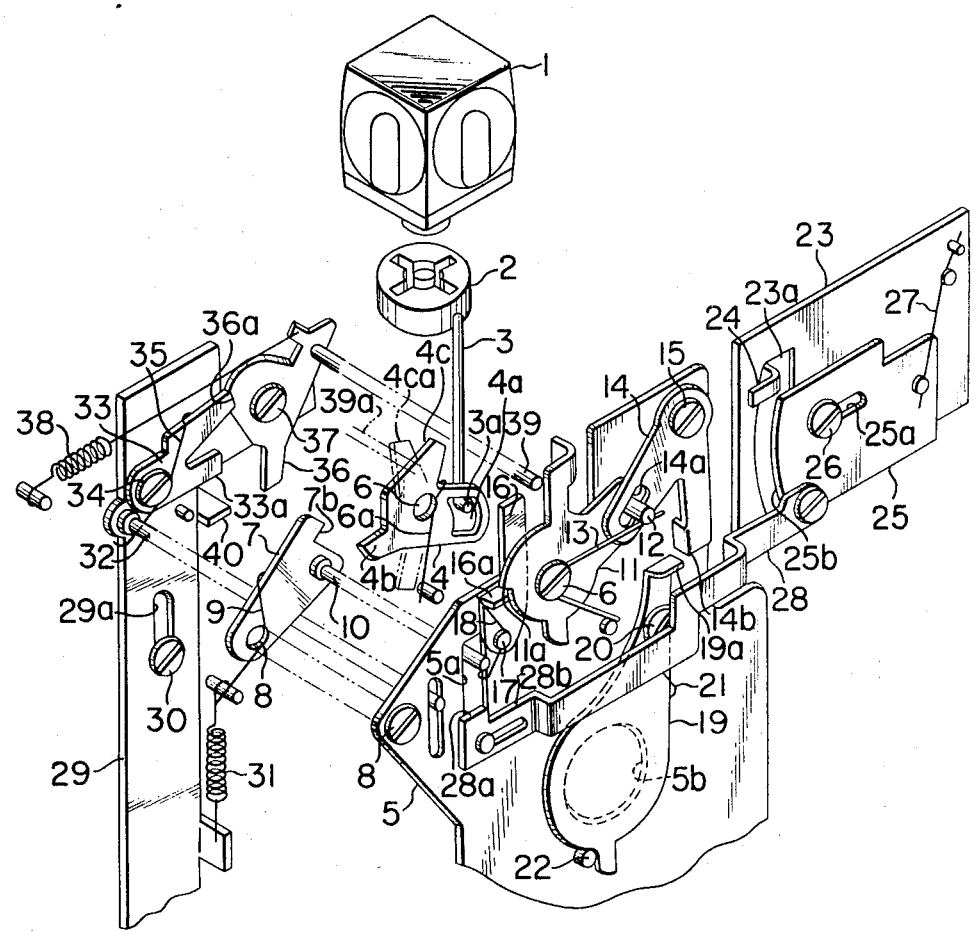

FLASHBULB TRIGGERING DEVICE FOR EE CAMERAS

BACKGROUND OF THE INVENTION

The present invention relates to generally a flashbulb triggering device, and more particularly a flashbulb triggering device for use in an EE camera, that is a camera incorporating therein an electronic eye which device will not trigger the flashbulb when the brightness of scene is sufficient enough to use the EE mechanism, but will trigger the flashbulb in response to the depression of a shutter release button or the like when the brightness of scene is not enough to use the EE mechanism.

In an EE camera provided with a percussive flashbulb device in which either of a stop or a shutter speed or both are automatically controlled in response to the angle of deflection of a pointer of the EE mechanism, there has been used a device for flashbulb photography in which whether the brightness of scene is sufficient enough or not to use the EE mechanism is detected by a pointer pressure plate from the angle of deflection of the pointer of the exposure meter. Accordingly when the brightness of scene is sufficient enough to use the EE mechanism, the pointer pressure plate maintains a power switch open to prevent a flashbulb from being triggered while when the brightness is not sufficient the pointer pressure plate closes the power switch in response to the shutter release operation thereby triggering the flashbulb. However, when a percussive flashbulb is used, it is not controlled by the device of the type described in which a power circuit is closed or opened in the manner described to trigger or not to trigger the flashbulb. That is, in order to synchronize the actuation of a shutter blade or blades with the starting or triggering of the flashbulb, there must be provided a release member which is actuated in unison or almost in unison with a shutter blade driving member. However, this release member is inevitably actuated whenever the shutter blade or blades are actuated so that the flashbulb is misfired. Therefore, the prior art device cannot control the operation of the flashbulb in response to the brightness of scene. That is, when a flashbulb is mounted on the camera, it is fired whenever the brightness of scene is sufficient enough to operate the EE mechanism. Therefore, no picture is taken and the flashbulb is wasted.

SUMMARY OF THE INVENTION

One of the objects of the present invention is, therefore, to provide an EE camera provided with a device for automatically controlling a flashbulb triggering or firing device in response to the brightness of a subject.

Another object of the present invention is to prevent the misfiring of a flashbulb when the brightness of scene is sufficient to actuate the EE mechanism.

Still another object of the present invention is to provide an EE camera capable of taking a picture of better quality without giving consideration to whether the brightness of scene is sufficient enough to use the EE mechanism or not.

Briefly stated, in accordance with the present invention a control lever which is drivingly coupled to a pressure plate whose displacement is controlled by a pointer of an exposure meter is adapted to control whether a flashbulb is triggered or not. When the brightness of a subject is enough to actuate and permit the use of an EE mechanism, the pressure plate is displaced a relatively small distance while it is displaced a relatively long distance when the brightness is not enough to actuate the EE mechanism. Control means at the leading end of a control lever which is displaced in response to the displacement of the pressure plate is adapted to control the angle of rotation of a follower lever which is drivingly coupled to a shutter release lever so that the angle of rotation of a member for controlling or releasing a trigger pin of a flashbulb is controlled. That is, when the releasing member is rotated through a relatively greater angle, the flashbulb is triggered.

The above and other objects and features of the present invention will become more apparent from the following description of one illustrative embodiment thereof taken in conjunction with the accompanying drawing.

BRIEF DESCRIPTION OF THE DRAWING

The single FIGURE is a perspective exploded view of a device for flash photography in accordance with the present invention.

DESCRIPTION OF THE PREFERRED EMBODIMENT

A percussive flashbulb 1 is mounted on a socket 2 of a camera which rotates through 90° in response to each film winding operation so that a new flashbulb may be brought into the flashing position. A (trigger) member 3 which has a bent end 3a and is normally biased downward by a spring (not shown), is adapted to rise in response to the shutter release operation so as to press a trigger pin (not shown) of the flash-bulb to trigger it. A drive plate 4 which is pivoted to the rear surface of a shutter base 5 with a pin 6 is provided with an arm 4b and a hole 4a into which is loosely fitted the bent portion 3a of the trigger member 3 to provide a sufficient play or clearance. The drive plate 4 is normally biased to rotate in the clockwise direction under the force of a spring 6a. In the initial phase of the rotation of the drive plate 4 in the counterclockwise direction, the trigger member 3 is retained in inoperative position, but is caused to rise to trigger the trigger pin (not shown) in the last phase of the rotation of the drive plate 4 in the counterclockwise direction. A follower lever 7 which is pivoted to the rear surface of the shutter base 5 with a pin 8 is biased to normally rotate in the clockwise direction under the force of a spring 9, has a pin 10 which extends forwardly through an opening 5a of the base 5. A projection 7b of the follower lever 7 is adapted to engage with the arm 4b of the drive plate 4 when the follower lever 7 is rotated in the clockwise direction, so that the drive plate 4 is caused to rotate in the counterclockwise direction. A shutter blade driving lever 11 having a stepped portion 11a and a pin 12 is pivoted to the front surface of the shutter base 5 with the pin 6 of the drive plate 4 and is biased to normally rotate in the counterclockwise direction under the force of a spring 13 which in turn is loaded between the shutter base 5 and the pin 12. A bell crank lever 14 is pivoted to the shutter base 5 with a pin 15 and is provided with a slot 14a into which is fitted the pin 12 of the blade driving lever 11 and with a bent portion 14b. A connecting rod 16 is pivoted to the shutter base 5 with a pin 17, biased to rotate in the clockwise direction under the force of a spring 18 and is actuated with an arcuated slot 23a into which is fitted a bent portion of a pointer 24. A pointer pressure plate 25 is guided by a pin 26 extending from the base plate 26 and fitting into an elongated slot 25a of the pointer pressure plate 25 to slide thereupon in the longitudinal direction, and is biased to slide to the left under the force of a spring 27. In operation, the pointer pressure plate 25 is adapted to move toward the left in response to the downward movement of a shutter release plate to be described hereinafter by a mechanism (not shown) and to return to its normal position as will be described in more detail hereinafter. The width of the pointer pressure plate 25 is slightly smaller than the angular pointer deflection range. When the brightness of scene is sufficient enough to permit the use of an EE mechanism, the pointer 24 is pressed against the side edge of the opening 23a by the pointer pressure plate 25 upon depression of the shutter release button or the like (not shown). That is, the displacement of the pointer pressure plate 25 is limited. On the other hand when the brightness of scene is not sufficient enough to permit the use of the EE mechanism, the pointer pressure plate may be free to displace without being restrained by the pointer 24. That is, the displacement of the pointer pressure plate 25 is increased. In response to the displacement of the pressure plate 25, a control lever 28 is displaced to the right or left. When the shutter is released, one end of the control lever 28 is to engageable with the pin 10 of the follower lever 7. The control lever 28 is provided with a higher stepped portion 28a and a lower stepped portion 28b so that when the displacement of the pointer pressure plate 25 is small the pin 10 engages with the higher stepped portion 28a and when the displacement is greater, the pin 10 engages with the lower stepped portion 28b.

A shutter release plate 29 is guided by a pin 30 fitted into an elongated slot 29a to vertically slide over the stationary member of the camera, and is normally biased to move upward under the force of a spring 31. Upon depression of the shutter release button (not shown), the shutter release plate 29 is forced to move downward against the spring 31. The shutter release plate 29 is provided with a pin 32 which engages with the lower edge of the follower lever 7 and retains under camera into the path of the arm 33a of the retaining member 33 engages with the arm 33a when the shutter release plate 29 moves downward so that the retaining member 33 is caused to rotate in the counterclockwise direction against the spring 35. As a consequence the release lever 36 is released.

As described previously, when the brightness of the subject is sufficient enough to use the EE mechanism, the pressure plate 25 and the control lever 28 are restrained by the pointer 24. Therefore, when upon depression of the shutter release button the shutter release plate 29 is moved downward, the pointer pressure plate 25 together with the control lever 28 moves to the left a small distance by the mechanism (not shown). Simultaneously the follower lever 7 rotates in the clockwise direction under the force of the spring 9 following the pin 32 until the pin 10 engages with the higher stepped portion or projection 28a of the control lever 28. Consequently the rotation of the follower lever 7 will not rotate the drive lever 4 in the counterclockwise direction and the trigger member 3 remains in stationary state. When the shutter release plate 29 further moves downward the pin 39 is moved to the position 39a, the arm 4c of the drive plate 4 comes to the position to be able to drive the tip of the connecting rod 16 without engaging with the arm 4c of the drive plate 4. The retaining member 35 engages with the projection 40 and is caused to rotate in the counterclockwise direction to release the shutter release lever 36. As a consequence the lever 36 is caused to rotate in the counterclockwise direction under the force of the spring 38 so that the pin 39 causes the connecting rod 16 to rotate in the counterclockwise direction, whereby the shutter driving lever 11 is released. The driving lever 11 is caused to rotate in the counterclockwise direction under the force of the spring 13 so that the bent portion 14b of the crank lever 14 kicks the bent portion 19a of the shutter blade 19. Therefore, the shutter blade 19 is rotated in the manner described hereinbefore to permit the exposure. In this case, a stop is automatically controlled by a stop blade or the like which is drivingly coupled to the exposure meter (not shown), and the trigger member 3 is not actuated by the drive plate 4 so that a flashbulb is not triggered.

When the brightness of scene is not enough to actuate the EE mechanism, the pointer pressure plate 25 together with the control lever 28 are displaced a relatively long distance to the left in response to the downward movement of the shutter release plate 29 without being restrained by the pointer 24. The follower lever 7 follows the pin 32 and rotates the clockwise direction until the pin 10 engages with the lower stepped portion 28b of the control lever 28. Consequently an arm 7b of the follower lever 7 and the arm 4b of the drive lever 4 are engaged, and the drive plate 4 rotates till the lower portion of opening 4a is pressed to the lower portion 3a of the trigger member 3, and the arm 4c stops at the position 4ca. When the release plate 29 is moved downward and the retaining member 35 is released, the release lever 36 is caused to rotate in the counterclockwise direction by means of the spring 38 and simultaneously the drive plate 4 is rotated in counterclockwise direction. As a result, the trigger member 3 is pushed upward by means of the lower portion of the opening 4a, which movement pushes up the firing-pin (not shown) and flashes the flash lamp at the time of shutter operation.

The follower lever 7 and the pointer pressure 25 are returned to their normal position as the shutter release plate 29 is returned to its normal position. The shutter blade driving lever 11 and the shutter release lever 36 are caused to rotate in the clockwise direction against the springs 13 and 38 respectively when the film is advanced so that they are stored with the energy. In response to the clockwise direction of the shutter blade driving lever 11, the bell crank lever 14 is caused to rotate in the counterclockwise direction so that its bent portion 14b passes over the surface of the bent portion 19a of the shutter blade to return to the initial position indicated in the figure.

What is claimed is:

1. In an EE camera incorporating a device for triggering a percussive flashbulb, a device for flashbulb photography comprising
   a shutter blade driving lever;
   a shutter release plate actuated by a camera release button;
   a shutter release lever which is energized when film is advanced and is released in response to the actuation of said shutter release plate to drive said shutter blade driving lever;
   a follower lever having a control pin and rotatable in response to said actuation of said shutter release plate;
   a trigger pin for triggering said flashbulb;
   a drive plate having a slot portion within which an end of said trigger pin is loosely mounted in a lost motion connection, said drive plate adapted to be driven by said follower lever in response to the rotation of said shutter release lever to actuate said trigger pin end for triggering said flashbulb after movement through said lost motion connection; and
   a control lever having a stepped end portion to provide a higher portion and a lower portion, the positions of said portions determined in response to the position of an exposure-meter pointer when said shutter release plate is actuated;
   whereby when the brightness of scene is sufficient to use an EE mechanism, the displacement of said follower lever is limited by positioning said higher stepped portion when said shutter release plate is actuated so that said drive plate is prevented from actuating said trigger member while when the brightness of scene is not sufficient to use said EE mechanism, said control lever is displaced so that said control pin of said follower lever engages with said lower stepped portion so that the displacement of said follower lever is increased to cause said drive plate to actuate said trigger member thereby triggering said flashbulb.

2. Device according to claim 1 in which said shutter release plate includes a connected pin adapted to prevent rotation of said follower lever prior to actuation thereof.

3. Device according to claim 1 in which biasing means is connected to said follower lever to return said follower lever to its non-triggering position after triggering of said flashbulb.

* * * * *